US012036895B2

(12) United States Patent
Fu et al.

(10) Patent No.: US 12,036,895 B2
(45) Date of Patent: Jul. 16, 2024

(54) AIRFLOW SENSING SEAT

(71) Applicant: Tangtring Seating Technology Inc., Guangdong (CN)

(72) Inventors: Zhimin Fu, Guangdong (CN); Chenlong Mei, Guangdong (CN); Jiayu Yu, Guangdong (CN); Qipeng Liu, Guangdong (CN); Xingfeng Li, Guangdong (CN); Jingfeng Zheng, Guangdong (CN)

( * ) Notice: Subject to any disclaimer, the term of this patent is extended or adjusted under 35 U.S.C. 154(b) by 0 days.

(21) Appl. No.: 17/766,750

(22) PCT Filed: Dec. 27, 2019

(86) PCT No.: PCT/CN2019/128942
§ 371 (c)(1),
(2) Date: Apr. 6, 2022

(87) PCT Pub. No.: WO2021/068419
PCT Pub. Date: Apr. 15, 2021

(65) Prior Publication Data
US 2024/0092226 A1  Mar. 21, 2024

(30) Foreign Application Priority Data

Oct. 8, 2019 (CN) .......................... 201910947952.7

(51) Int. Cl.
*B60N 2/00* (2006.01)
*B60N 2/02* (2006.01)
(Continued)

(52) U.S. Cl.
CPC ......... *B60N 2/0022* (2023.08); *B60N 2/0244* (2013.01); *B60N 2/12* (2013.01);
(Continued)

(58) Field of Classification Search
CPC ...... B60N 2/0022; B60N 2/0244; B60N 2/12; B60N 2/16; B60N 2/5678; B60N 2/829
See application file for complete search history.

(56) References Cited

U.S. PATENT DOCUMENTS 8,251,447 B2 * 8/2012 Fujita .................. A61B 5/6892
297/284.6
2010/0117411 A1 * 5/2010 Fujita .................. A61B 5/6887
600/484

(Continued)

FOREIGN PATENT DOCUMENTS

CN  101439688 A  *  5/2009
CN  108638930 A  *  10/2018  ............. B60N 2/665
JP  2008194321 A  *  8/2008  ............. A47C 9/002

OTHER PUBLICATIONS

Machine Translation of Du's reference (CN-108638930-A) (Year: 2018).*

(Continued)

*Primary Examiner* — Tarek Elarabi

(57) ABSTRACT

An airflow sensing seat, having a seat body, an airbag, a sensing assembly, and a micro control unit. The airbag is in the seat body. A deformable support structure is in the airbag. The support structure is used to maintain an appropriate amount of gas in the airbag. A transmission mechanism is provided between the airbag and the sensing assembly. The transmission mechanism transmits gas disturbance in the airbag to the sensing assembly. The sensing assembly generates a corresponding analog electrical signal according to the gas disturbance. The sensing assembly is electrically connected to the micro control unit. The sensing assembly transmits the analog electrical signal to the micro control unit. The micro control unit performs analysis and computation on the analog electrical signal so as to acquire a biological signal of a user.

8 Claims, 11 Drawing Sheets

(51) Int. Cl.
*B60N 2/12* (2006.01)
*B60N 2/16* (2006.01)
*B60N 2/56* (2006.01)
*B60N 2/829* (2018.01)

(52) U.S. Cl.
CPC ............. *B60N 2/16* (2013.01); *B60N 2/5678* (2013.01); *B60N 2/829* (2018.02)

(56) References Cited

U.S. PATENT DOCUMENTS

2010/0117414 A1* 5/2010 Hwang .................. B60N 2/665
297/217.3
2016/0354027 A1* 12/2016 Benson ................ A61B 5/7282

OTHER PUBLICATIONS

Machine Translation of He's reference (CN-101439688-A) (Year: 2009).*

* cited by examiner

AIRFLOW SENSING SEAT

BACKGROUND OF THE INVENTION

The present invention relates to the technical field of automobile seats, and in particular relates to an airflow sensing seat, which can measure biological signals such as breathing and heart rate of passengers by detecting airflow change, and change seat parameters according to the biological signals so as to provide more comfortable and healthy services for the customers.

With the rapid development of contemporary automotive technology, the automobile is gradually coming into thousands of households, and has become the main means of transport for people's daily travel; at the same time, people pay more and more attention to the riding comfort of the automobile seat, whether it can provide users with comfortable and convenient service has become one of the important indicators to evaluate the performance of the seat. At present, the automobile seat in China mainly employs an elastic filler as the main filer of a seat cushion and a backrest part so as to achieve the wrapping of the seat to a human body. However, an existing seat still has defects in the automatic detection of the biological signals of the human body and the provision of comfort, healthy, safety and convenient services according to the biological signals, and cannot provide personalized services for individual biological characteristics.

In recent years, the technologies for the detection of biological signals and for the provision of the comfort and healthy services based on the biological signals have gradually become a research hotspot, especially the requirements for automatic detection technology of various biological signals such as breathing and heart rate is increasing, the main reason is that the breathing and heart rate of the passenger can effectively reflect the physical and mental state of the passenger, so that the breathing and heart rate have become the basis for providing more new services. Most of the traditional automobile seats detect the change of blood flow in the face through cameras so as to obtain physiological signals of the user. Although the detection method can achieve non-contact detection, the defects thereof are that the computation burden is large, the detection result is easily affected by the ambient light and body movement, and is easy to involve the privacy issues of the user. There are also some automobile seats that employ radars to sense micro-vibration of the chests so as to obtain physiological signals of the user through conversion. Although the detection method does not involve the privacy of the user, the radar needs to be aligned to the chest area of the user in the detection process, and extra energy needs to be injected at the same time, whether damage exists to human health or not needs to be verified at present. In addition, there are also some automobile seats that detect the physiological signals of the user by embedding piezoelectric sensing assemblies, capacitive film sensors, piezoelectric cable sensors and the like in the seat cushion and backrest. However, as the embedded electronic assemblies under long-term pressure are highly susceptible to damage, the service life is short, and the damage or short circuit of the circuit also has great potential safety hazards.

BRIEF SUMMARY OF THE INVENTION

To solve the technical problem, an airflow sensing seat is provided, comprising a seat body, an airbag, a sensing assembly, and a micro control unit, wherein the airbag is provided in the seat body, a deformable support structure is provided in the airbag, and the support structure is used to maintain an appropriate amount of gas in the airbag; a transmission mechanism is provided between the airbag and the sensing assembly; the transmission mechanism is used to transmit gas disturbance in the airbag to the sensing assembly; the sensing assembly is used to generate a corresponding analog electric signal according to the gas disturbance; the sensing assembly is electrically connected to the micro control unit, and the sensing assembly transmits the analog electric signal to the micro control unit; and the micro control unit is used to perform analysis and computation on the analog electric signal so as to acquire a biological signal of a user.

Further, the airbag comprises a first airbag layer and a second airbag layer; edges of the second airbag layer and the first airbag layer are hermetically connected to form a bag-shaped structure; the deformable support structure is provided between the first airbag layer and the second airbag layer, a connector is provided on the airbag, and the connector is hermetically connected to the transmission mechanism.

Further, the support structure is made of a polymer material, a sandwich mesh fabric, cotton, sponge or a non-woven fabric.

Further, the first airbag layer and the second airbag layer are both made of a soft and impermeable polymer material; and the support structure is prepared by using a plastic molding process.

Further, the transmission mechanism comprises a conveying pipe and a pressure regulating sheet, one end of the conveying pipe is communicated with the airbag, and the other end of the conveying pipe is in fit with the sensing assembly; a pressure regulating opening is formed on the conveying pipe, the pressure regulating sheet is detachably provided on the pressure regulating opening, and a plurality of micro-pore channels communicated with the outside are formed on the pressure regulating sheet.

Further, the airflow sensing seat further comprises an output unit, and the output unit is a wireless communication network, a vehicle communication circuit, a controller area network, a serial data communication protocol, Ethernet, a display unit, a light or sound indicator, a sound generation unit, or an internal memory.

Further, the seat body is further provided with an adjusting system for changing seat parameters, and the adjusting system is electrically connected to the micro control unit so as to receive a seat parameter adjusting signal sent by the micro control unit.

Further, the seat parameters comprise one or more of a seat height, a seat angle, a headrest height, a seat front-back position, a waist support height, a seat temperature, and seat ventilation.

Further, the sensing assembly comprises a sensor and an amplifier; the sensor is used to generate the analog electric signal corresponding to the gas disturbance, and the amplifier is used to amplify the analog electric signal; the micro control unit comprises an analog-to-digital converter and a computation unit, the analog-to-digital converter is used to convert the amplified analog electric signal into a digital signal, and the computation unit is used to perform analysis and computation on the digital signal so as to acquire a biological signal.

An intelligent seat adjusting method based on the airflow sensing seat, comprising the following steps:

monitoring the gas disturbance inside the airbag through the sensing assembly, and generating the analog electric signal corresponding to the gas disturbance;

amplifying the analog electric signal;

converting the amplified analog electric signal into the digital signal;

performing analysis and computation on the digital signal so as to acquire the biological signal; and adjusting, by the micro control unit, seat parameters according to the biological signal.

Further, the step of performing analysis and computation on the digital signal so as to acquire a biological signal comprises the following sub-steps:

processing the digital signal using a bandpass filter according to the characteristics of the biological signal so as to extract a sample signal; and filtering out an interference signal in the sample signal to acquire the biological signal.

The airflow sensing seat disclosed by the present invention has the following beneficial technical effects:

compared with the prior art, an airflow sensing seat is disclosed by the present invention, an airbag is embedded in a seat body of the seat, a deformable support structure is provided in the airbag to guarantee an appropriate amount of gas in the airbag; the internal gas may flow after the airbag is compressed, and caused gas disturbance can be transmitted to a sensing assembly in time through a transmission mechanism, and the sensing assembly can generate a matched analog electric signal according to a sensed gas disturbance signal, and a micro control unit is used to analyze the analog electric signal so as to acquire a biological signal. In the process of acquiring the biological signal, only the airbag needs to be embedded in the seat body, the airbag can be provided on a seat part or a back part of the seat or both, no other electronic pressure sensing assemblies need to be provided, so that the phenomenon that a traditional electronic pressure sensing assembly is damaged due to excessive pressure is avoided; and in the detection process, no air pump is required to inflate the airbag; and therefore, the whole seat is simple in structure, low in cost and long in service life. The most important is that the transmission mechanism is further provided with a slow air leakage structure, which prevents the generation of strong airflow disturbance, and guarantees that the airflow disturbance is always in the detection range of the sensing assembly, thus improving accuracy of the detection.

1—seat body; 11—backrest; 12—seat cushion; 2—airbag; 21—support structure; 22—first airbag layer; 23—second airbag layer; 24—communicating air pipe; 3—sensing assembly; 31—sensor; 32—amplifier; 4—micro control unit; 41—analog-to-digital converter; 42—computation unit; 5—transmission mechanism; 51—pressure regulating sheet; 52—conveying pipe; 53—first air guide pipe; 54—second air guide pipe; 55—neck structure; 6—output unit; 7—adjusting system; 71—back heating device; 72—back ventilation device; 73—massage device; 74—seat cushion heating device; 75—waist support device; 76—shoulder support device; 77—flank support device; 78—hardness adjusting device.

The accompanying drawings are for illustrative purposes only and are not to be construed as limiting the present invention. To illustrate the present embodiments better, certain components of the accompanying drawings may be omitted, enlarged, or reduced and are not representative of actual product dimensions. It is understandable to those skilled in the art that certain well-known structures in the accompanying drawings and description thereof may be omitted. The same or similar reference numbers correspond to the same or similar components. The terms describing the positional relationship in the accompanying drawings are for exemplary illustration only and are not to be construed as limiting the present invention.

DETAILED DESCRIPTION OF THE INVENTION

The preferred embodiments of the present invention are described in detail below with reference to the accompanying drawings, so that the advantages and features of the present invention will be more readily understood by those skilled in the art, and thus the scope of protection of the present invention will be more clearly defined.

Embodiment 1

Figure 1:
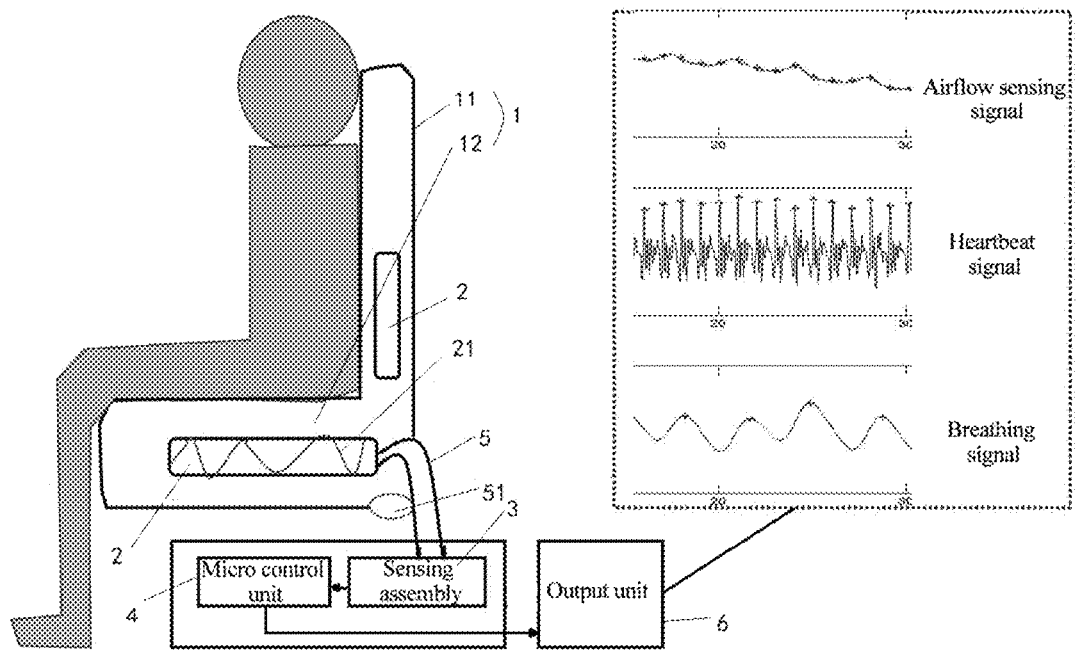
FIG. 1 is an architecture diagram of an airflow sensing seat in an embodiment 1.
Figure 2:
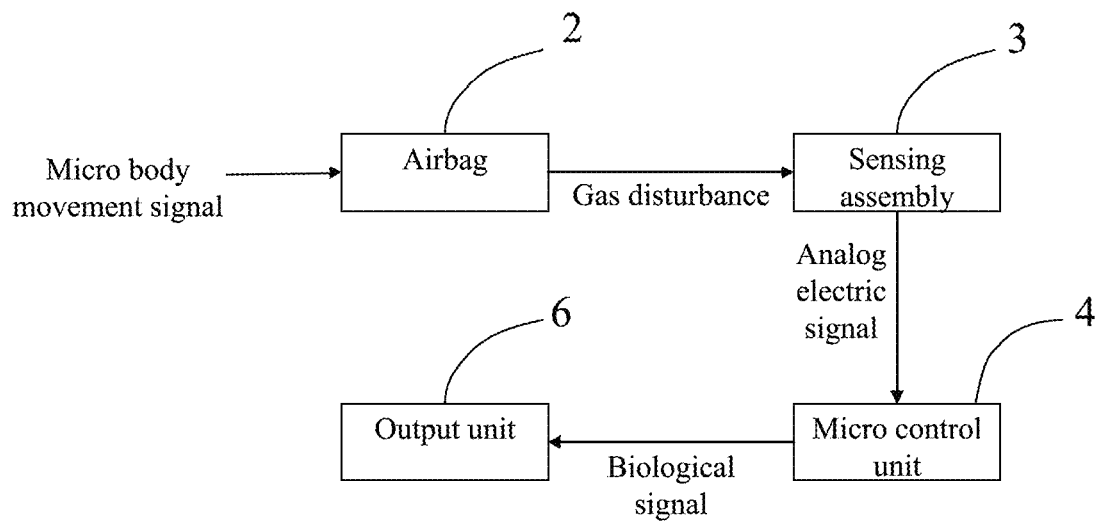
FIG. 2 is a diagram of a connection relationship among an airbag, a sensing assembly, a micro control unit, and an output unit in an embodiment 1.

As shown in FIG. 1 and FIG. 2, an airflow sensing seat is provided by this embodiment, comprising a seat body 1, an airbag 2, a sensing assembly 3, and a micro control unit 4. The airbag 2 is provided in the seat body 1, a deformable support structure 21 is provided in the airbag 2, the support structure 21 provides a space for the gas, and the support mechanism 21 is used to maintain an appropriate amount of gas in the airbag 2. As the change in volume of the compressed airbag 2 causes airflow disturbance in the airbag 2, in order to achieve the variable volume of the airbag 2, the support structure 21 provided in the airbag 2 must have a certain micro-elasticity and also need to have a space to accommodate an appropriate amount of gas. A transmission mechanism 5 is provided between the airbag 2 and the sensing assembly 3, and the transmission mechanism 5 is used to transmit gas disturbance in the airbag 2 to the sensing assembly 3. The sensing assembly 3 can sense micro change of the airflow and generate an analog electric signal corresponding to the gas disturbance according to the micro change of the gas. The sensing assembly 3 is electrically connected to the micro control unit 4, and the sensing assembly 3 may transmit the generated analog electric signal to the micro control unit 4. The micro control unit 4 is used to perform analysis and computation on the analog electric signal so as to acquire a biological signal of a user. Wherein the biological signal may refer to a heart rate frequency band, a breathing frequency band, height-related information, weight-related information, body-type-related information, and body movement signals such as speaking, sitting, getting up, sitting posture fine-adjustment, and the like.

Figure 9:
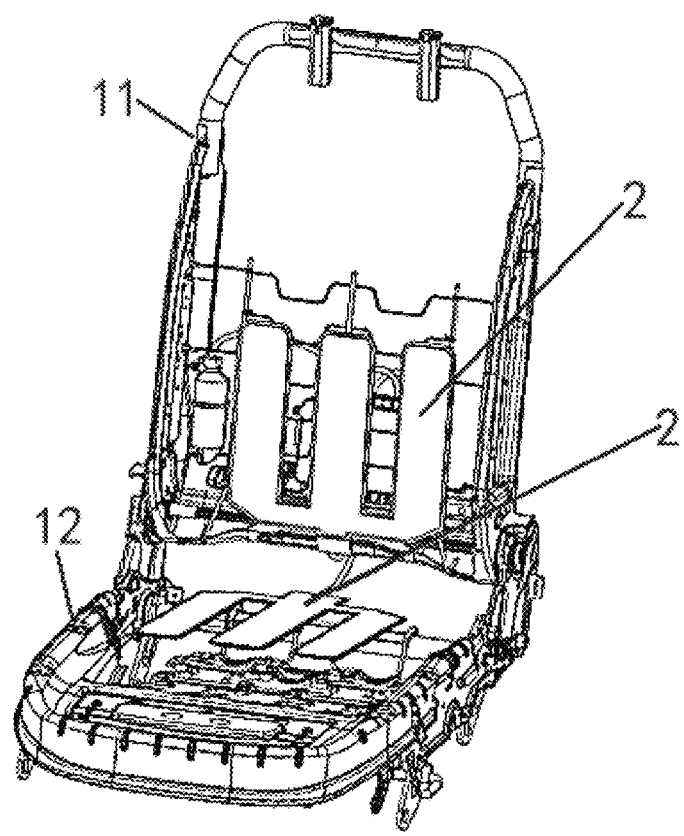
FIG. 9 is a distribution diagram of an airbag in a seat body in an embodiment 1.

In general, a plurality of airbags 2 need to be embedded in the seat body 1 to achieve comprehensive and accurate detection of the body movement signals of a user, as shown in FIG. 9, a plurality of airbags 2 are evenly distributed on a backrest 11 and a seat cushion 12 of the seat body 1, and each airbag 2 is respectively provided with the sensing assembly 3 and the micro control unit 4. When a human body sits on the seat body 1, physiological activities of the human body may have the effect on the airbags 2 provided on the seat cushion 12 and the backrest 11, as breathing continues, the compression condition of the airbag 2 provided in the backrest 11 may be changed, and then the airflow in the airbag may generate slight change; the micro change of the airflow in each airbag 2 may be transmitted to the corresponding sensing assembly 3 through the transmission mechanism 5, then the sensing assembly 3 outputs a corresponding analog electric signal to the micro control unit 4, and the micro control unit 4 completes the analysis on the analog electric signal so as to acquire a biological signal. The biological signals acquired through the various micro control units 4 are firstly classified by a classifier, and then the classified biological signals are integrated and then transmitted to the output unit 6. Wherein the classifier comprises an artificial neural network, a decision tree, a support vector machine, and a Bayesian belief network. The output unit 6 may employ any one of a wireless communication network, a vehicle communication circuit, a controller area network, a serial data communication protocol, Ethernet, a display unit, a light or sound indicator, a sound generation unit, or an internal memory, which is not limited thereto. In this embodiment, a total of six airbags 2 are embedded in the seat body 1, wherein three airbags 2 are provided in the seat cushion 12 side by side, and the other three airbags 2 are provided in the backrest 11 side by side, the airbag 2 is of a square bag-shaped structure, and the six airbags 2 basically cover the whole area of the seat cushion 12 and the backrest 11. Certainly, the providing number of the airbags 2 can be appropriately adjusted according to the area of the airbag 2, in general, the more the number of the airbags 2 is, the larger the monitoring range is, and the more accurate the detection result is. The providing number of the airbags 2 is not specifically limited herein.

Figure 4:
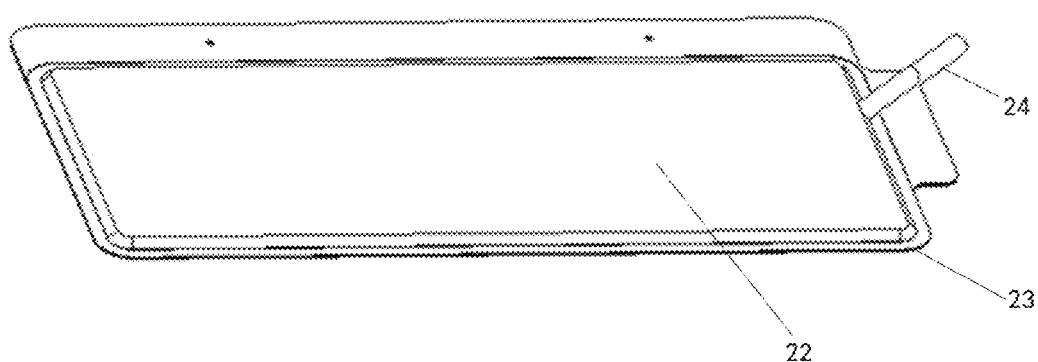
FIG. 4 is a diagram of an overall structure of an airbag in an embodiment 1.
Figure 5:
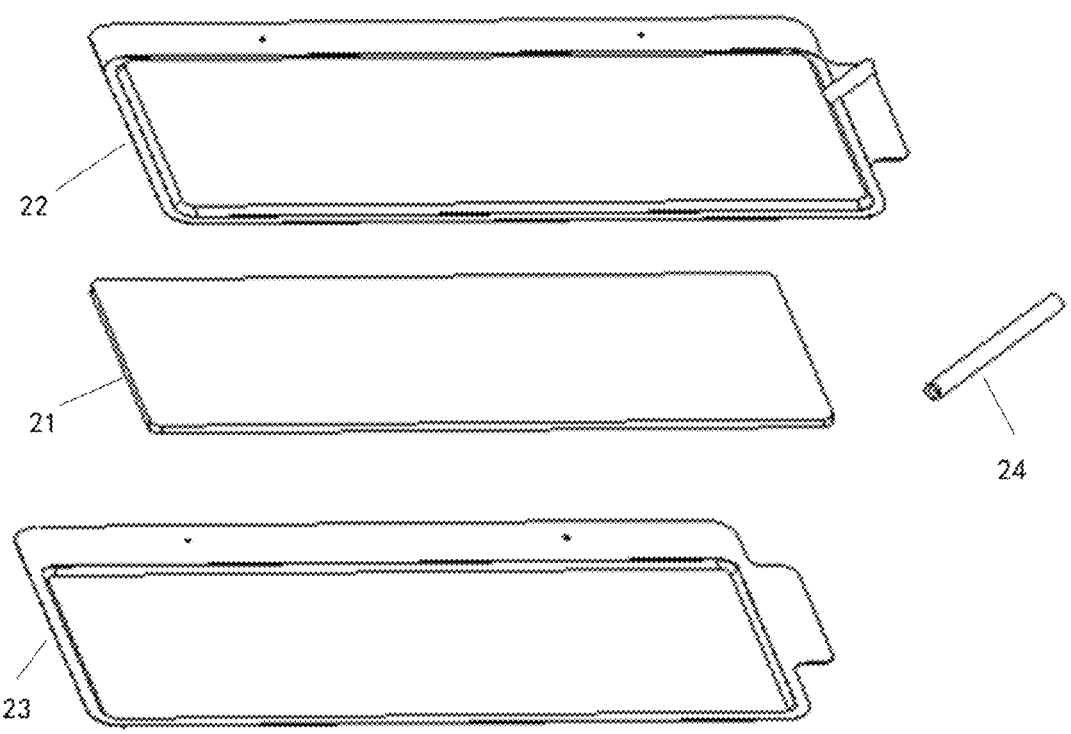
FIG. 5 is a diagram of a connection relationship of various components of an airbag in an embodiment 1.

As shown in FIG. 4 and FIG. 5, preferably, the airbag 2 comprises a first airbag layer 22 and a second airbag layer 23. The first airbag layer 22 and the second airbag layer 23 are both made of a flexible and impermeable polymer material. Edges of the second airbag layer 23 and the first airbag layer 22 are hermetically connected in a hot-melt bonding mode so as to form a bag-shaped structure. A deformable support structure 21 is provided between the first airbag layer 22 and the second airbag layer 23. A connector is provided on the airbag 2, a communicating air pipe 24 is installed at the connector, and the communicating air pipe 24 is hermetically connected to the transmission mechanism 5. The support structure 21 provided in the airbag 2 may be an elastic and soft filler, such as a polymer material, a sandwich mesh fabric, cotton, sponge or a non-woven fabric, preferably cotton; or may be a specific support shape, which can distract the airbag 2 using the structure of the shape itself so as to maintain a certain amount of gas without external inflation assemblies. The support structure 21 may also be made of the same polymer material as the first airbag layer 22 and the second airbag layer 23; in a case that the support structure 21 is made of the polymer material, the support structure is generally prepared by a plastic injection molding process. In this embodiment, the first airbag layer 22, the second airbag layer 23 and the support structure 21 are all made of a polyvinyl chloride (PVC) material.

Figure 6:
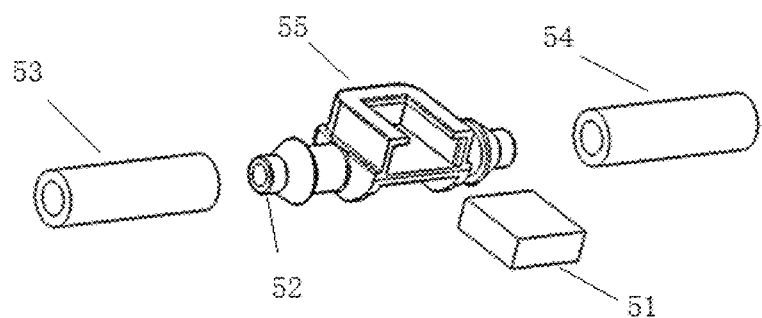
FIG. 6 is a diagram of a positional relationship of various components of a transmission mechanism in an embodiment 1.
Figure 7:
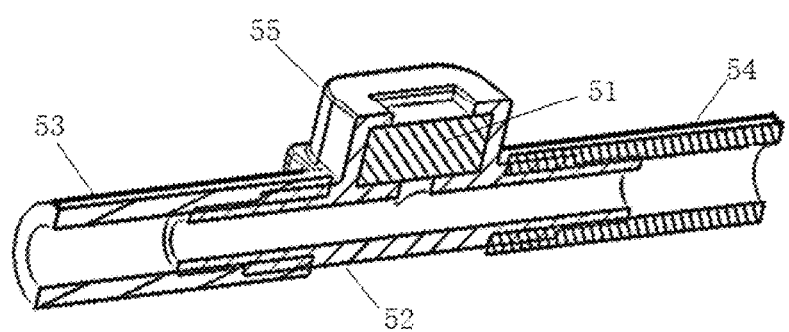
FIG. 7 is a sectional diagram of a transmission mechanism in an embodiment 1.
Figure 8:
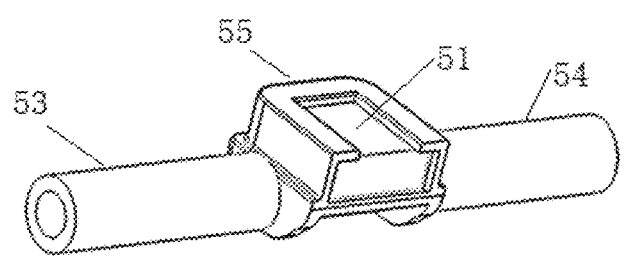
FIG. 8 is a diagram of an overall structure of a transmission mechanism in an embodiment 1.

Preferably, to prevent a signal generated by the airflow disturbance from exceeding the sensing range of the sensing assembly 3, a slow air leakage structure can be provided on the airbag 2 or the transmission mechanism 5, the balance of internal and external air pressure is maintained while the transmission of an airflow disturbance signal is guaranteed, signal saturation or abnormal conditions are avoided, and meanwhile, the sensing range of the sensing assembly 3 can take the human bodies with different weights and gas volume adjustment into consideration. The transmission mechanism 5 with a slow air leakage function is taken as an example for illustration. As shown in FIG. 6, FIG. 7 and FIG. 8, the transmission mechanism 5 comprises a conveying pipe 52 and a pressure regulating sheet 51. One end of the conveying pipe 52 is connected to the communicating air pipe 24 provided on the airbag 2 through a first air guide pipe 53 so as to achieve the communication of the conveying pipe 52 and the airbag 2; the other end of the conveying pipe is connected to a second air guide pipe 54, the second air guide pipe 54 is in fit with the sensing assembly 3, i.e., an air outlet end of the second air guide pipe 54 is opposite to the sensing assembly 3 and used to transmit the gas disturbance to the sensing assembly 3. A pressure regulating opening is formed on the conveying pipe 52, the pressure regulating sheet 51 is fit with the pressure regulating opening, the pressure regulating sheet 51 is detachably connected to the conveying pipe 52, and a plurality of micro-pore channels communicated with the outside are formed on the pressure regulating sheet (51).

Preferably, the conveying pipe 52 is provided with a neck structure 55 extending outwards at a position corresponding to the pressure regulating opening, and the pressure regulating sheet 51 is connected to the conveying pipe 52 through the neck structure 55. In this embodiment, the pressure regulating sheet 51 is plastic with micro-pore channels, and is formed by sintering plastic particles. An operating mode of the pressure regulating sheet 51 belongs to a passive pressure regulating mode, the micro-pore channels on the pressure regulating sheet 51 can slowly change the internal and external pressures to maintain the balance of the internal and external pressures; in a case that the internal airflow pressure increases and the external pressure is smaller than the internal pressure, the airflow may flow outwards to achieve the effect of pressure regulation; in a case that the internal airflow pressure decreases and the external pressure is greater than the internal pressure, the airflow may flow inwards to achieve the effect of pressure regulation, wherein the external pressure is the natural atmospheric pressure. Such slow air leakage arrangement of the transmission mechanism is conducive to avoiding the situation that the sensing assembly 3 is saturated due to the fact that the signal generated when someone sits on at the beginning changes too much.

Figure 10:
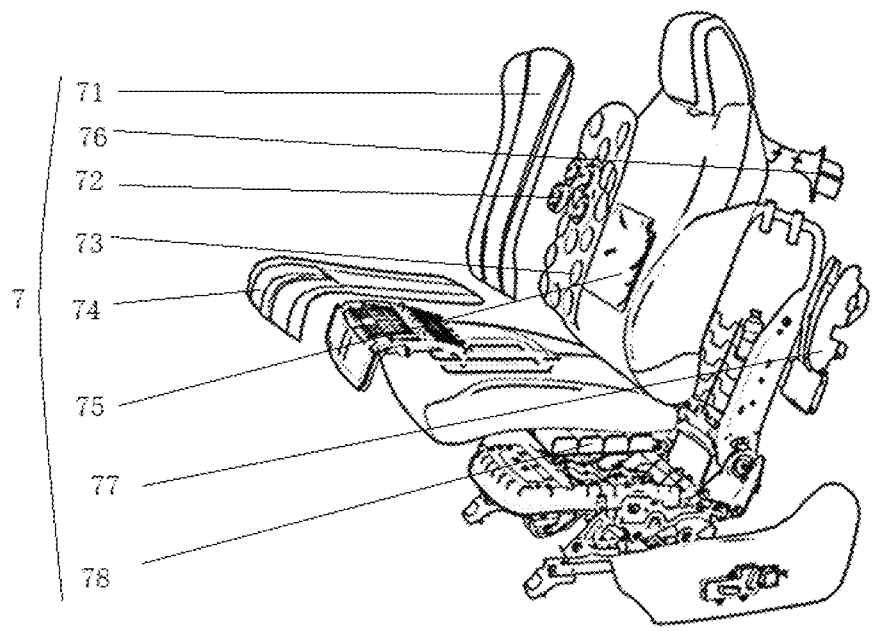
FIG. 10 is a distribution structure diagram of an adjusting system in a seat body in an embodiment 1.

Preferably, the seat body 1 is further provided with an adjusting system 7 for changing seat parameters, the adjusting system 7 is electrically connected to the micro control unit 4 so as to receive a seat parameter adjusting signal sent by the micro control unit, and the adjusting system 7 makes corresponding adjustment according to the seat parameter adjusting signal. The adjusting system 7 comprises a back heating device 71, a back ventilation device 72, a massage device 73, a seat cushion heating device 74, a waist support device 75, a shoulder support device 76, a flank support device 77, a hardness adjusting device 78, and the like, as shown in FIG. 10. Certainly, the user can also add other adjusting devices according to the own needs. As various adjusting devices in the embodiment are in the prior art, unnecessary details are not given herein. The adjusting system is electrically connected to the micro control unit 4, and the micro control unit 4 changes the seat parameters by sending the seat parameter adjusting signal. Wherein the seat parameters comprise a seat height, a seat angle, a headrest height, a seat back-forth position, waist support height and hardness, a seat temperature, seat ventilation and the like. The adjustment of various seat parameters may automatically correspond to different biological signals, and the biological signals are used as the basis for automatically controlling the adjusting system. For example, the adjustment of the seat height and the seat angle needs to perform adaptive adjustment based on the height signal, the weight signal and the body type signal of the user, while the detection of the height signal, the weight signal and the body type signal can be completed only by means of a comparison database. That is, when detecting the height signal, the weight signal or the body type signal, the comparison database of the height signal, the weight signal, the body type signal and the pneumatic signal needs to be established at first to find out the relationship between different heights, different weights and different body types and the pneumatic signals. Certainly, an external proven comparison database can also be directly introduced. In addition, the back heating device 71, the back ventilation device 72, the massage device 73, the seat cushion heating device 74, the waist support device 75, the shoulder support device 76, the flank support device 77 and the hardness adjusting device 78 disclosed by this embodiment can be adjusted manually by the driver without the seat parameter adjusting signal, which is not limited here.

Figure 3:
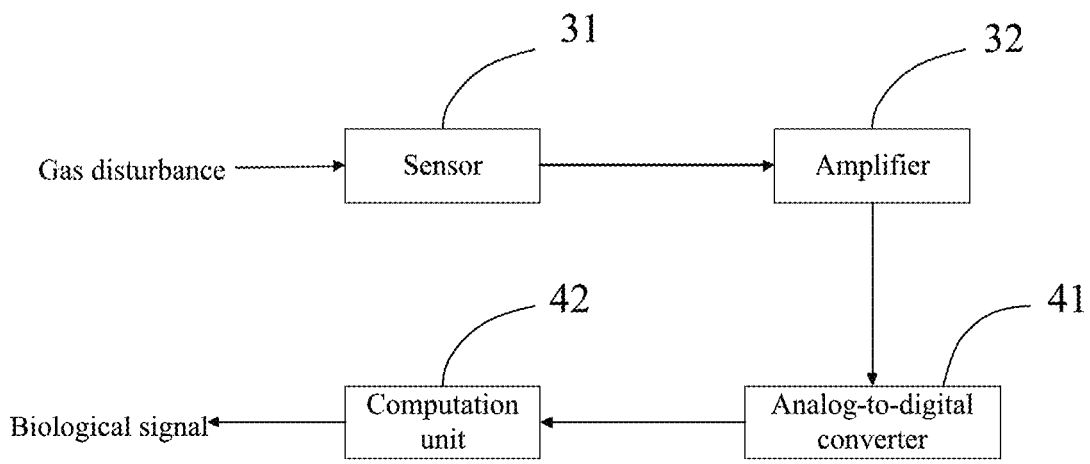
FIG. 3 is a diagram of a connection relationship among a sensor, an amplifier, an analog-to-digital converter, and a computation unit in an embodiment 1.

As shown in FIG. 3, preferably, the sensing assembly 3 comprises a sensor 31 and an amplifier 32, and the sensor 31 is used to generate the analog electric signal corresponding to the gas disturbance. The amplifier 32 is actually an amplifying circuit, which is used to amply the weak analog electric signal collected by the sensor 31. Wherein the amplifier 32 may employ an LM833 assembly of TI, while the sensor 31 may employ a pressure sensor of MXP2010. The pressure sensor can generate the corresponding analog voltage signal according to a pneumatic signal of the gas. The principle of collection is to use a piezoelectric film, the film may generate current when compressed, so that the airflow change can be converted into an electric signal, the principle and process of the generation of the analog voltage signal are all in the prior art, unnecessary details are not given here. Certainly, a speed sensor or an airflow sensor may also be used for operation as well. The micro control unit 4 comprises an analog-to-digital converter 41 and a computation unit 42, the analog-to-digital converter 41 is used to convert the amplified analog electric signal into a digital signal, and the computation unit 42 is used to perform analysis and computation on the digital signal so as to obtain a biological signal. The signal analysis can be completed only through the cooperation of the analog-to-digital converter 41 and the computation unit 42. The reason is that most of signals in the natural world are analog signals and continuous, in a case that the computation unit needs to be used for processing, the processing requirements of a digital calculator can be satisfied only by sampling the continuous analog signals to become discrete signals, and then converting the discrete signals into quantized bit signals. In this embodiment, the micro control unit 4 may employ a Microchip dsPIC33 series processor or an NXP 32K144 series processor, and the two series of micro-processors are each internally provided with the computation unit 42 and the analog-to-digital converter 41. Certainly, the analog-to-digital converter 41 may also be independently provided outside the micro control unit 4 and can be connected to the micro control unit 4 using an additional assembly.

The airflow sensing seat disclosed by this embodiment has a wide application value, which can be installed not only on an automobile, but also on a two-wheel vehicle, an airplane, a ship and even a wheelchair. The detection of biological signal can be achieved only by starting the sensing assembly 3 in time to transmit gas disturbance signal after the vehicle is pneumatically operated.

The airflow sensing seat disclosed by this embodiment can collect the biological signal based on the gas flow in the airbag 2 provided in the seat body 1, the support structure 21 for distracting the airbag is provided in the airbag 2 to maintain an appropriate amount of gas in the airbag 2, so that the airbag 2 does not need to be inflated using an air pump, the structure is simple, and the use is convenient. Moreover, the micro-pore channels for communicating with the outside world are maintained for the transmission mechanism 5 due to the adoption of a non-sealing design, so that the defect that the signal of the sensing assembly 3 is saturated or damaged due to excessive pressure is effectively avoided. The most important is that the seat body 1 combines a monitoring system for biological signal detection with the adjusting system to achieve non-interference combination, so that the installation structure is simplified, the difficulty of production and maintenance is reduced, and the reliability of the seat body is improved.

Embodiment 2

Figure 11:
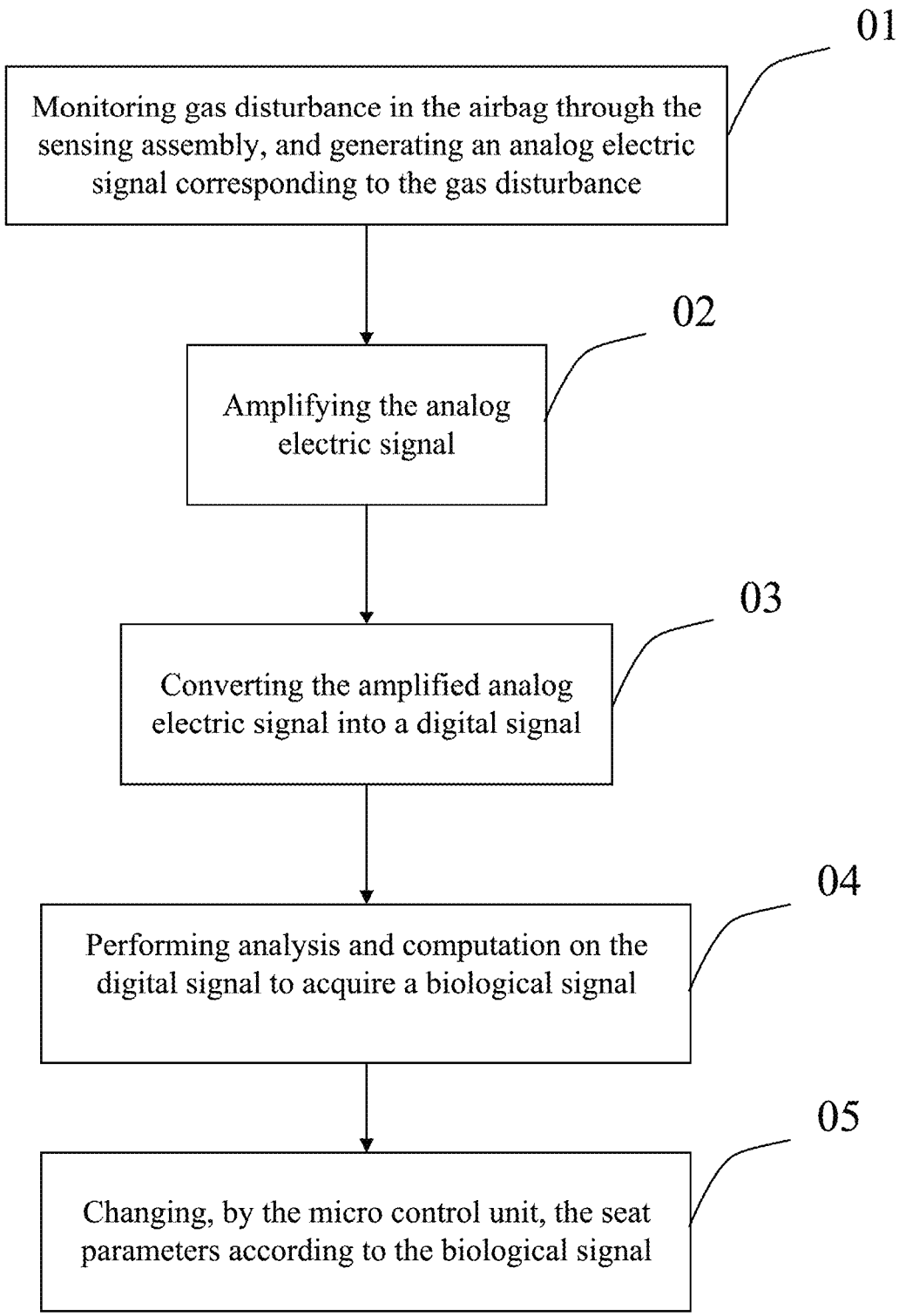
FIG. 11 is a flow diagram of an intelligent seat adjusting method in an embodiment 2.

As shown in FIG. 11, an intelligent seat adjusting method is disclosed by this embodiment, the method is based on the airflow sensing seat in the embodiment 1 and specifically comprises the following steps:

01, monitoring the gas disturbance in the airbag 2 through the sensing assembly 3, and generating the analog electric signal corresponding to the gas disturbance.

Figure 13:
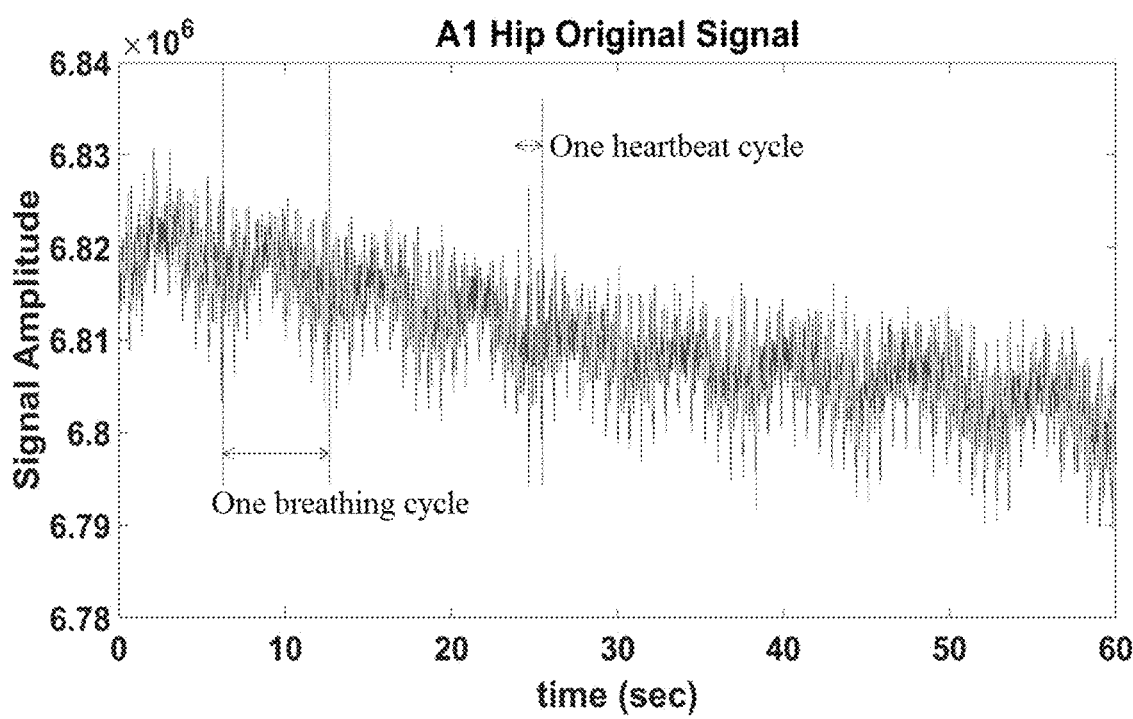
FIG. 13 is a diagram of an acquired analog electric signal corresponding to gas disturbance in an embodiment 2.

Specifically, the detection of the breathing signal and the heartbeat signal of the user is taken as an example for illustration. When a human body sits on the seat body 1, the breathing and heartbeat of the human body may have direct effect on the compression condition of the airbags 2 provided in the seat cushion 12 and the backrest 11, when the compression on the airbag 2 changes, the gas in the airbags 2 necessarily changes slightly, and due to the fact that the airbag 2 is in fit with the sensing assembly 3 through the transmission mechanism 5, the transmission mechanism 5 can reflect the airflow change in the airbag 2 to a pressure sensor in the sensing assembly 3 in real time. A piezoelectric film in the pressure sensor may generate corresponding current when impacted by the airflow, and then the pneumatic signal is converted into the analog electric signal, as shown in FIG. 13.

02, Amplifying the analog electric signal.

Due to the fact that the gas in the airbag 2 only changes slightly, the analog electric signal obtained through the conversion of the pressure sensor is relatively weak, and the analog electric signal needs to be amplified using an amplifying circuit so as to improve the subsequent calculation precision.

03, Converting the amplified analog electric signal into the digital signal.

As the pneumatic signal belongs to an analog signal and is continuous, the analog electric signal obtained through conversion is also continuous. However, the digital calculator can only process the discrete signal, so that, before performing analysis and computation on the signal, the analog-to-digital converter 41 must be used to convert the continuous analog electric signal into a quantized bit signal so as to obtain an original data signal, as shown in the upper diagram in FIG. 14.

04, Performing analysis and computation on the digital signal so as to obtain the biological signal.

The detection mode for the heart rate frequency band and the breathing frequency band comprises: enabling signals to pass through the bandpass filter, wherein the frequency band can be properly adjusted to contain required physiological signals, then performing short-time extrema detection to find out extrema in a period of time, and then analyzing the spacing between adjacent extrema to find out the extrema represented by the heartbeat frequency and the breathing frequency, and then the performing post-processing to remove abnormal extreme points, then counting the extrema without abnormal extreme points, and outputting a statistical value or related information in the computation to the output unit. It can be known from the medical knowledge that the frequency of the heartbeat signal is between 1 Hz to 8 Hz, and the frequency of the breathing signal is between 0.1-0.6 Hz.

Figure 12:
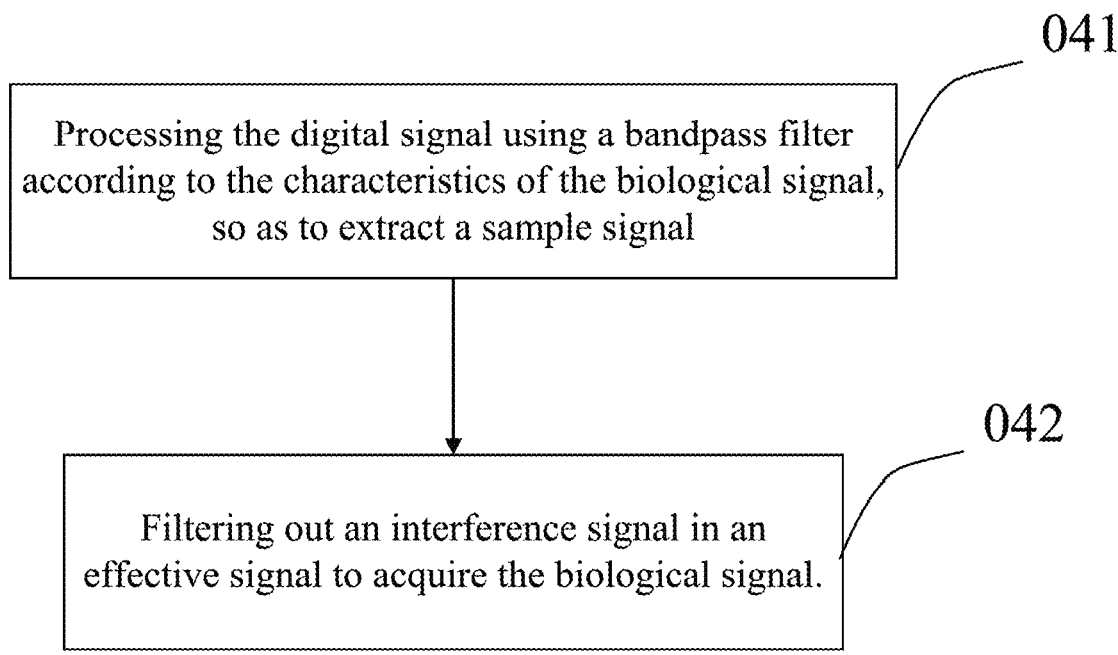
FIG. 12 is a flow diagram of performing analysis and computation on a digital signal in an embodiment 2.

By taking the heartbeat signal and the breathing signal as the example, the analysis and computation process on the digital signal is illustrated in steps, as shown in FIG. 12:

041, processing the digital signal using the bandpass filter according to features of the biological signal so as to extract a sample signal.

Figure 14:
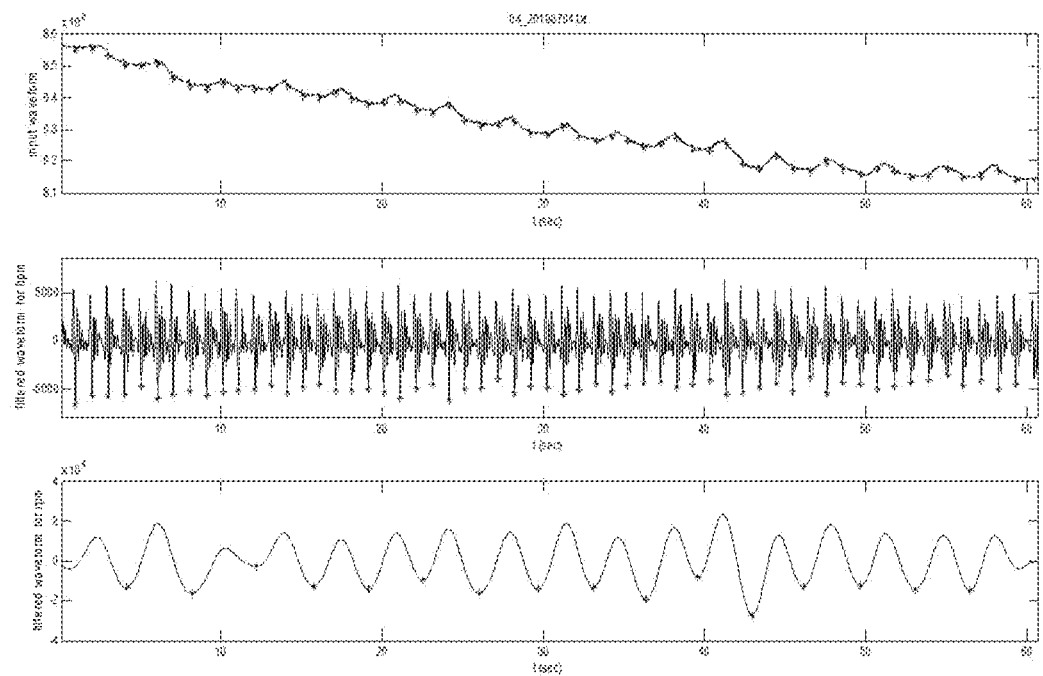
FIG. 14 is a diagram of an obtained digital signal, a filtered heartbeat sample signal and a filtered breathing sample signal in an embodiment 2.

Observing the upper graph (original data signal) in FIG. 14 based on the heartbeat signal frequency and the breathing signal frequency, it can be discovered that large disturbance in the figure has a relevance with the breathing signal, a relatively sharp signal with large amplitude has a certain relevance with the heartbeat, wherein one heartbeat cycle and one breathing cycle have been marked in the figure. Wherein the breathing is the large disturbance, and the heartbeat is small disturbance. The principle of the relevance is obtained by comparing with the ECG, ECG is a common medical-grade device at present, with an accuracy rate of 94% or above under a static condition by using a signal acquisition mode of the present invention. The large disturbance may be directly linked to breathing, which is a direct observation of the relationship between breathing and signals; it is concluded that the breathing may cause changes of the airflow in the airbag, and the change in the airflow may be reflected to the system of the present invention.

Based on the relevance above, the original data signal is processed through an appropriate bandpass filter so as to extract a sample signal. During extraction, the heart rate signal frequency is set as 0.8-20 Hz, the frequency is obtained by counting the range of the heartbeat vibration frequency of the human body; and the breathing signal frequency is set as 0.1-0.6 Hz, the breathing signal frequency is obtained by counting the range of the breathing frequency of the human body. The frequency band of the bandpass filter can be approximately adjusted during use so as to encompass the required biological signals. In this embodiment, the bandpass filter employs a six-order Butterworth filter.

The mode of obtaining the locations of the heartbeat time and the breathing time is to use short-time extrema detection. The short-time extrema detection comprises: taking a signal within a short period of time, such as 0.5 second, then finding out extrema within the 0.5 second, wherein the extrema can be a maximum or a minimum, that is, obtaining a peak or a trough of a waveform, then continuously displacing within a short period of time to find the extrema within the next period of time, and repeating the steps all the time until all peaks or troughs can be found.

The extrema within a period of time can be found through the short-time extrema detection, for example, finding the extrema within 0.5 second. After finding the extrema, the spacing between every two extrema is analyzed according to the features of the biological signal. In general, the heartbeat is between 50 and 120 beats per minute, that is, every two extrema must be between 0.5 and 2 seconds to be the heartbeat signal. While the breathing is about 10-20 breaths per minute, that is, every two extrema must be between 3 and 6 seconds to be the breathing signal. The extrema represented by the heartbeat frequency and breathing frequency can be found out through extrema spacing analysis, and then the unnecessary extreme points can be removed through post-processing. Wherein in the post-processing, the median of the spacing of five pairs of extrema may be employed, or the absolute value of the filtered data can not exceed 60%. The finally obtained signals of the heartbeat frequency band and the breathing frequency band are as described in FIG. 14, wherein the middle graph in FIG. 14 is a signal graph of the heartbeat frequency band, and the lower graph in FIG. 14 is a signal graph of the breathing frequency band.

042, Filtering out an interference signal in the sample signal to obtain the biological signal.

Figure 15:
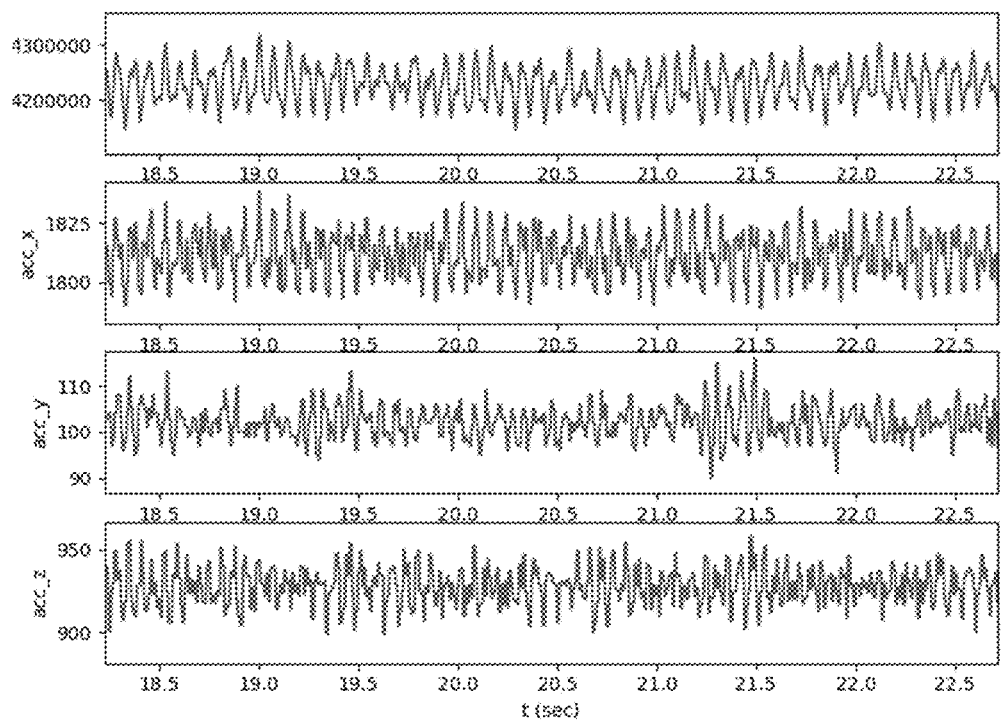
FIG. 15 is a diagram of an interference signal caused when an automobile engine is started in an embodiment 2.

It is well known that the seat body 1 may shake when a vehicle engine is started, and the human body sitting on the seat body 1 inevitably changes the posture accordingly to generate extrusion on the airbag 2 and then to generate the interference signal. Such interference generated by the engine must be filtered to improve the detection precision of the biological signal. Therefore, the pneumatic signal generated when the engine is started is analyzed. FIG. 15 is a pneumatic signal when the engine is started, wherein the upper graph is the pneumatic signal, and the other three sub-graphs below are respectively x-axle, y-axle and z-axle signals of an acceleration sensor. It can be seen that the shaking of the engine may cause the signal to contain a high-frequency vibration signal exceeding 10 Hz, the shaking signal of the engine is an interference, and such type of interference signal can be filtered after using the filter.

Figure 16:
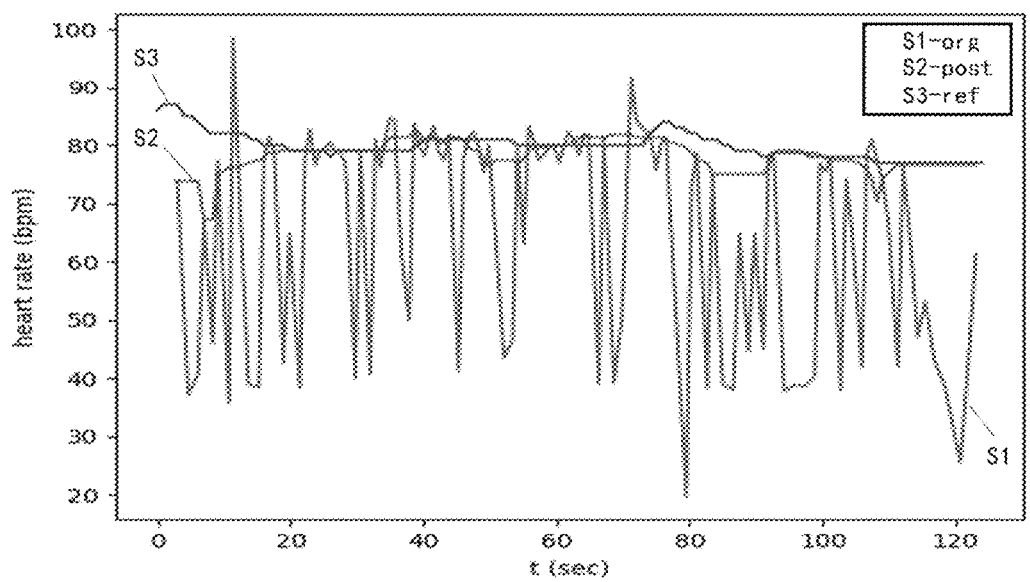
FIG. 16 is a comparison diagram of a post-processed heartbeat signal, a heartbeat signal without post-processing and a heartbeat signal acquired from electrocardiogram in an embodiment 2.

After the interference signal is filtered, the biological signal with high accuracy can be obtained through the post-processing technology. The post-processing technology in this embodiment may use a median of the numerical values in a section, thus some incoherent values can be removed, and the post-processing aims at enabling adjacent extrema to have a certain coherence and not change too much, thus finding out some signal judgment points which are not actually heartbeats or breaths. FIG. 16 is a post-processed heartbeat signal. Wherein ref is a heartbeat frequency obtained using ECG, while org is a heartbeat frequency without post-processing, and post is the post-processed heartbeat frequency. It can be known that the post-processed heartbeat frequency has a high agreement with the heartbeat frequency obtained using ECG.

Certainly, the algorithmic model can be used for analysis not only in time but also in frequency band. For example, the signal is subjected to Fourier transform, the Fourier transform time may be 5 seconds to 10 seconds, then the extrema of the signal of the heartbeat frequency band are found, thus the detection result also has high accuracy and is very close to the frequency correlation degree of the heartbeat. In addition, physiological signal features related to the frequency can be obtained through basal projection analysis processing, and besides Fourier spectral analysis, analysis skills such as wavelet transform time-frequency analysis, short-time Fourier transform analysis, Hilbert-Huang transform analysis and other signal analysis projection can be used. As the algorithmic models mentioned above are all in the prior art, unnecessary details are not given herein.

Figure 17:
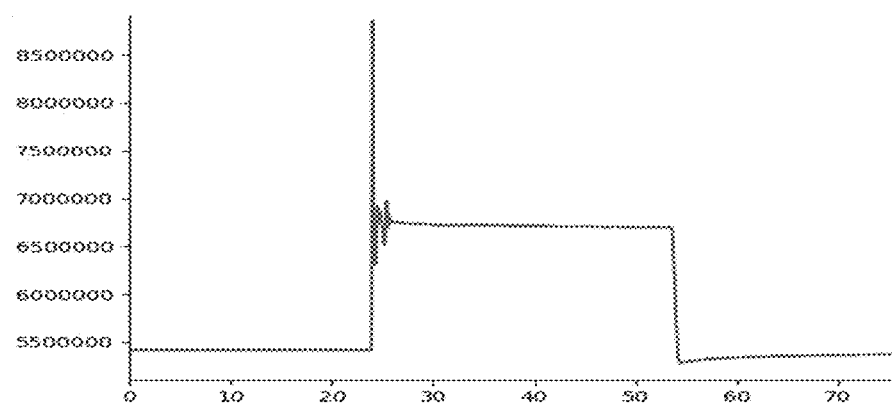
FIG. 17 is a change diagram of pneumatic signals when someone sits and when nobody sits in an embodiment 2.
Figure 18:
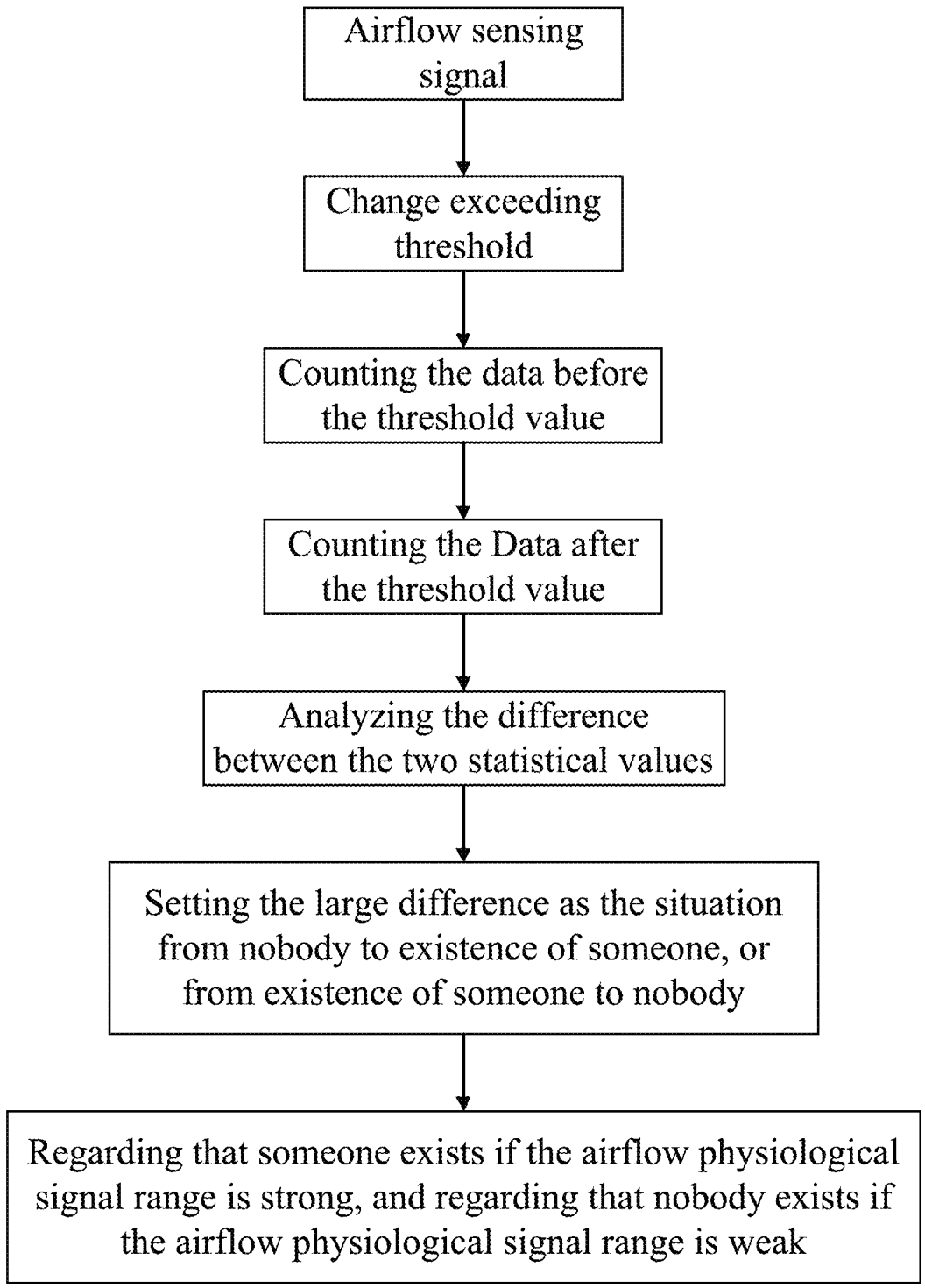
FIG. 18 is a flow diagram of an algorithm for judging whether someone sits on the seat or not in an embodiment 2.

It is worth noting that, prior to detecting the biological signal through the airflow sensing seat, whether someone sits on the seat body 1 or not can be confirmed at first, therefore, an algorithm of splitting the signals of two time periods is developed, and the difference between the signals of the two time periods is analyzed for confirming. Wherein dividing the signals of the two time periods is to utilize a great change of airflow disturbance, and to set a threshold value; in a case that the sudden increase proportion of the airflow disturbance value exceeds the threshold value, the features of the two signals are counted respectively, as shown in FIG. 17. When the statistical values of the two signals are quite different, it is judged that the signal of one of the time periods is that a human body signal exists, and the signal of the other of the time periods is that no human body signal exists. In general, the time period with the strong airflow physiological signal range is that the some exists, and the time period with weak airflow physical signal range is that nobody exists. The flow of the algorithm for judging whether someone sits on the seat or not is as shown in FIG. 18. Then the signal with the physical signal is further subjected to physical signal analysis.

Figure 19:
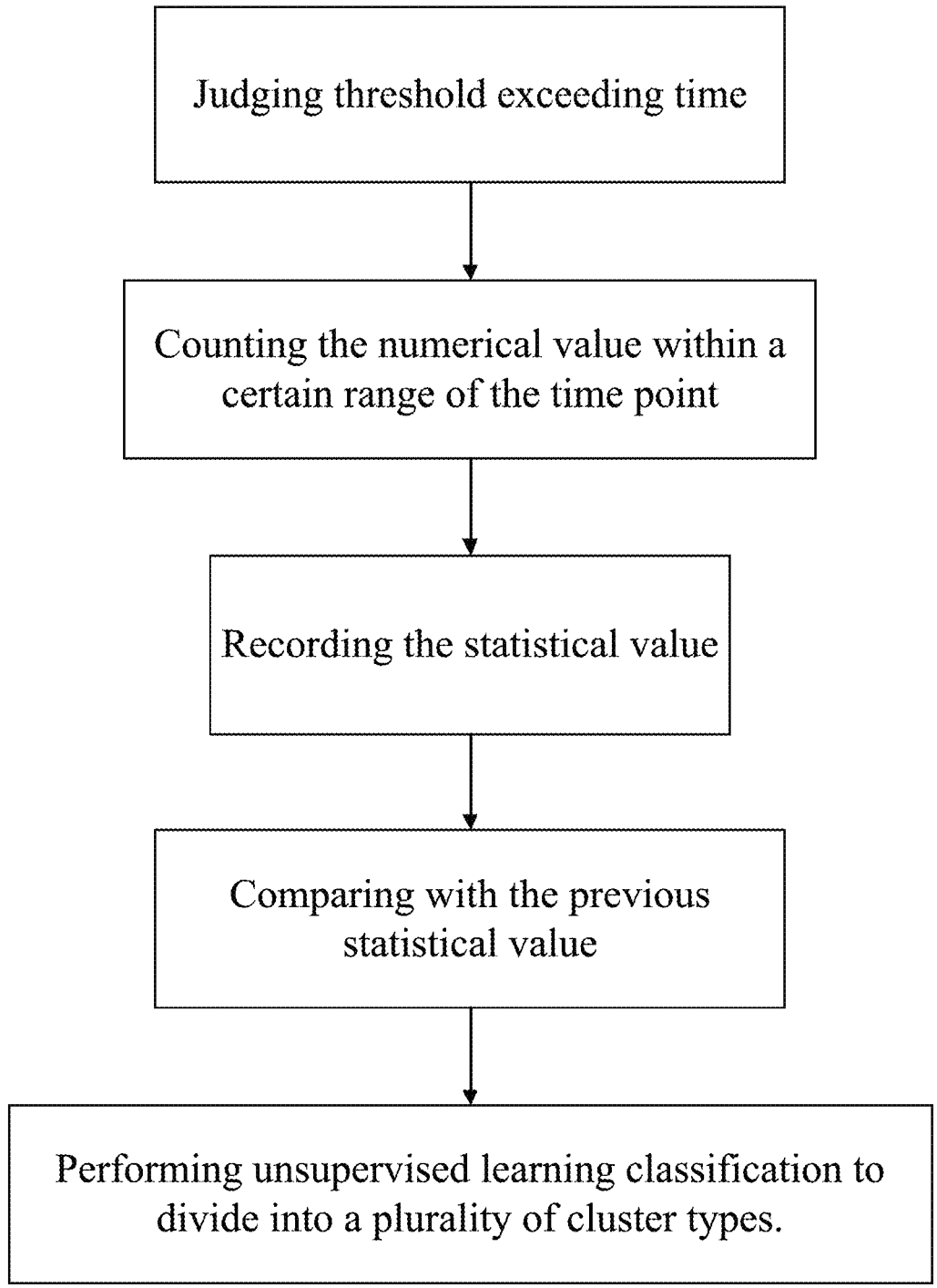
FIG. 19 illustrates an algorithm for classifying different sitting types in an embodiment 2.

In this embodiment, in the algorithm process of judging whether someone sits on the seat or not, the numerical values within a period of time of the time point exceeding the threshold can be counted within a period of time, and then the statistical value is record In general, the threshold exceeding time is judged to count the numerical values within a certain range of the time and to record the statistical value; then the statistical value is compared with the previous statistical value to achieve the unsupervised learning classification so as to obtain a plurality of clusters, as shown in FIG. 19. Certainly, the classification method may employ other existing calculation methods as long as the purpose of classification can be achieved, which is not limited here.

05, Adjusting, by the micro control unit 4, the seat parameters according to the biological signal The biological signals obtained in the step 04 are classified into a plurality of types and transmitted to the micro control unit, and the micro control unit 4 is used to respectively adjust the comfort level of the seat body 1 based on the various types of biological signals. During adjustment, the micro control unit 4 needs to analyze the various types of biological signals and then send a corresponding adjusting instruction to the adjusting system 7, and the adjusting system 7 is configured to complete the waist support adjustment, seat height adjustment, seat angle adjustment, seat front-back adjustment, massage and the like. In this embodiment, the adjusting system 7 comprises the back heating device 71, the back ventilation device 72, the massage device 73, the seat cushion heating device 74, the waist support device 75, the shoulder support device 76, the flank support device 77, and the hardness adjusting device 78. An adjusting mode of the adjusting system 7 comprises: firstly recording an original manual adjustment result, for example, recording a biological signal feature value of the seat height after adjusting the seat height, wherein the biological signal feature value may be the time difference of reaching a stable state after someone sits on the seat, and a mean value of the biological signal feature values in the stable state, and a signal change value of the two stable states. By utilizing the statistical value, the corresponding manually adjustment result can be obtained, so that the adjustment corresponding to various parts can be obtained by means of the obtained biological signals, and each adjustment can automatically correspond to automatic adjustment of different types. That is, the users with different heights, different body types and different weights need to sit on the seat body 1 respectively, and then various parameters of the seat body 1 are adjusted manually to make the users of various types reach the most comfortable state. Therefore, the micro control unit 4 can record various parameters corresponding to users with different heights, different body types and different weights, i.e., a database among the height, the body type, the weight and the seat parameter is established. Therefore, in the process of automatically adjusting the seat parameters, the matched seat parameters can be directly found out in the database as long as the micro control unit 4 acquires the height signal, the body type signal or the weight signal, then an adjusting instruction is sent by the adjusting system through according to the found seat parameters, and then the adjusting system completes adjustment of the various seat parameters.

Regardless of the technology used, measuring biological signals in automobiles is not an easy task. Challenges due to motion are caused not only by the vehicle, but also by the driver himself. When using a sensor technology not interfering the user, the challenges due to movement or motion are more difficult. Some parts of the challenge may be relieved through the application of sensor fusion. In the sensor fusion, a plurality of sensors at a plurality of locations are used to compensate for related technical challenge, for example, by using one sensor as a self-adaptive filtering noise signal. Source separation, for example, by applying algorithmic signals based on statistical dependencies (such as independent component analysis). Coverage rate enhancement, for example, by using a plurality of sensors for measuring the same vital signs; therefore, the possibility of acquire the vital signs at a certain time point is increased. By combining the detection technology of the present application with the prior art, the detection range of the biological signal can be effectively increased, and the detection accuracy is improved.

Apparently, the above embodiments of the present invention are merely examples for the purpose of clearly illustrating the present invention rather than the limitation to the embodiments of the present invention. For those of ordinary skill in the part, other variations or changes may also be made in various forms based on the above description. It is not necessary or possible to be exhaustive of all implementations here. Any modifications, equivalent replacements and improvements made within the spirit and principle of the present invention shall be encompassed within the scope of protection of the claims of the present invention.

What is claimed is:

1. An airflow sensing seat, comprising a seat body (1), an airbag (2), a sensing assembly (3) and a micro control unit (4), wherein the airbag (2) is provided in the seat body (1), a deformable support structure (21) is provided in the airbag (2), and the support structure (21) is used to maintain an appropriate amount of gas in the airbag (2); a transmission mechanism (5) is provided between the airbag (2) and the sensing assembly (3), and the transmission mechanism (5) is used to transmit gas disturbance in the airbag (2) to the sensing assembly (3); wherein the sensing assembly (3) is used to generate a corresponding analog electric signal according to the gas disturbance, the sensing assembly (3) is electrically connected to the micro control unit (4), and the sensing assembly (3) transmits the analog electric signal to the micro control unit (4); wherein the micro control unit (4) is used to perform analysis and computation on the analog electric signal so as to acquire a biological signal of a user; wherein the transmission mechanism (5) comprises a conveying pipe (52) and a pressure regulating sheet (51), one end of the conveying pipe (52) is communicated with the airbag (2), and the other end of the conveying pipe is in fit with the sensing assembly (3); and a pressure regulating opening is formed on the conveying pipe (52), the pressure regulating sheet (51) is detachably provided on the pressure regulating opening, and a plurality of micro-pore channels communicated with the outside are formed on the pressure regulating sheet (51).

2. The airflow sensing seat according to claim 1, wherein the airbag (2) comprises a first airbag layer (22) and a second airbag layer (23); edges of the second airbag layer (23) and the first airbag layer (22) are hermetically connected to form a bag-shaped structure; the deformable support structure (21) is provided between the first airbag layer (22) and the second airbag layer (23), a connector is provided on the airbag (2), and the connector is hermetically connected to the transmission mechanism (5).

3. The airflow sensing seat according to claim 2, wherein the support structure (21) is made of a polymer material, a sandwich mesh fabric, cotton, sponge or a non-woven fabric.

4. The airflow sensing seat according to claim 2, wherein the first airbag layer (22) and the second airbag layer (23) are both made of a soft and impermeable polymer material.

5. The airflow sensing seat according to claim 1, further comprising an output unit (6), wherein the output unit (6) is a wireless communication network, a vehicle communication circuit, a controller area network, a serial data communication protocol, Ethernet, a display unit, a light or sound indicator, a sound generation unit, or an internal memory.

6. The airflow sensing seat according to claim 1, wherein the seat body (1) is further provided with an adjusting system for changing seat parameters, and the adjusting system is electrically connected to the micro control unit (4) so as to receive a seat parameter adjusting signal sent by the micro control unit (4).

7. The airflow sensing seat according to claim 6, wherein the seat parameters comprise one or more of a seat height, a seat angle, a headrest height, a seat front-back position, a waist support height, a seat temperature, and seat ventilation.

8. The airflow sensing seat according to claim 1, wherein the sensing assembly (3) comprises a sensor (31) and an amplifier (32); the sensor (31) is used to generate the analog electric signal corresponding to the gas disturbance, and the amplifier (32) is used to amplify the analog electric signal; the micro control unit (4) comprises an analog-to-digital converter (41) and a computation unit (42), the analog-to-digital converter (41) is used to convert the amplified analog electric signal into a digital signal, and the computation unit (42) is used to perform analysis and computation on the digital signal so as to acquire a biological signal.

* * * * *